United States Patent [19]

Newbold et al.

[11] Patent Number: 4,830,250
[45] Date of Patent: May 16, 1989

[54] BICYCLE CARRIER

[75] Inventors: Dixon Newbold, Cranston; Ned Levine, Providence, both of R.I.

[73] Assignee: Rhode Gear U.S.A., Providence, R.I.

[21] Appl. No.: 948,333

[22] Filed: Dec. 31, 1986

[51] Int. Cl.$^4$ .............................................. B60R 9/10
[52] U.S. Cl. .................................... 224/314; 224/321
[58] Field of Search ................ 224/42.03 R, 42.03 A, 224/42.03 B, 309, 314, 321, 42.08, 315; 403/92, 94, 96; 248/291, 284

[56] References Cited

U.S. PATENT DOCUMENTS

| 639,765 | 12/1899 | Phipps | 403/96 X |
| 3,092,362 | 6/1963 | Walsh | 248/291 |
| 3,232,502 | 2/1966 | Kleinbortas | 224/314 X |
| 4,332,337 | 6/1982 | Kosecoff | 224/42.03 B |
| 4,452,385 | 6/1984 | Prosen | 224/321 |
| 4,513,897 | 4/1985 | Graber | 224/314 |
| 4,518,108 | 5/1985 | Allen | 224/314 |

Primary Examiner—Renee S. Luebke
Attorney, Agent, or Firm—Wolf, Greenfield & Sacks

[57] ABSTRACT

A collapsible carrier adapted for use on the rear portion of a motor vehicle has an outer frame member, an inner frame member and two support arms. The frame members and support arms depend radially from hub assemblies. The angular relationship of the frame members and support arms may be adjusted by small increments and locked at virtually any angular relationship.

20 Claims, 3 Drawing Sheets

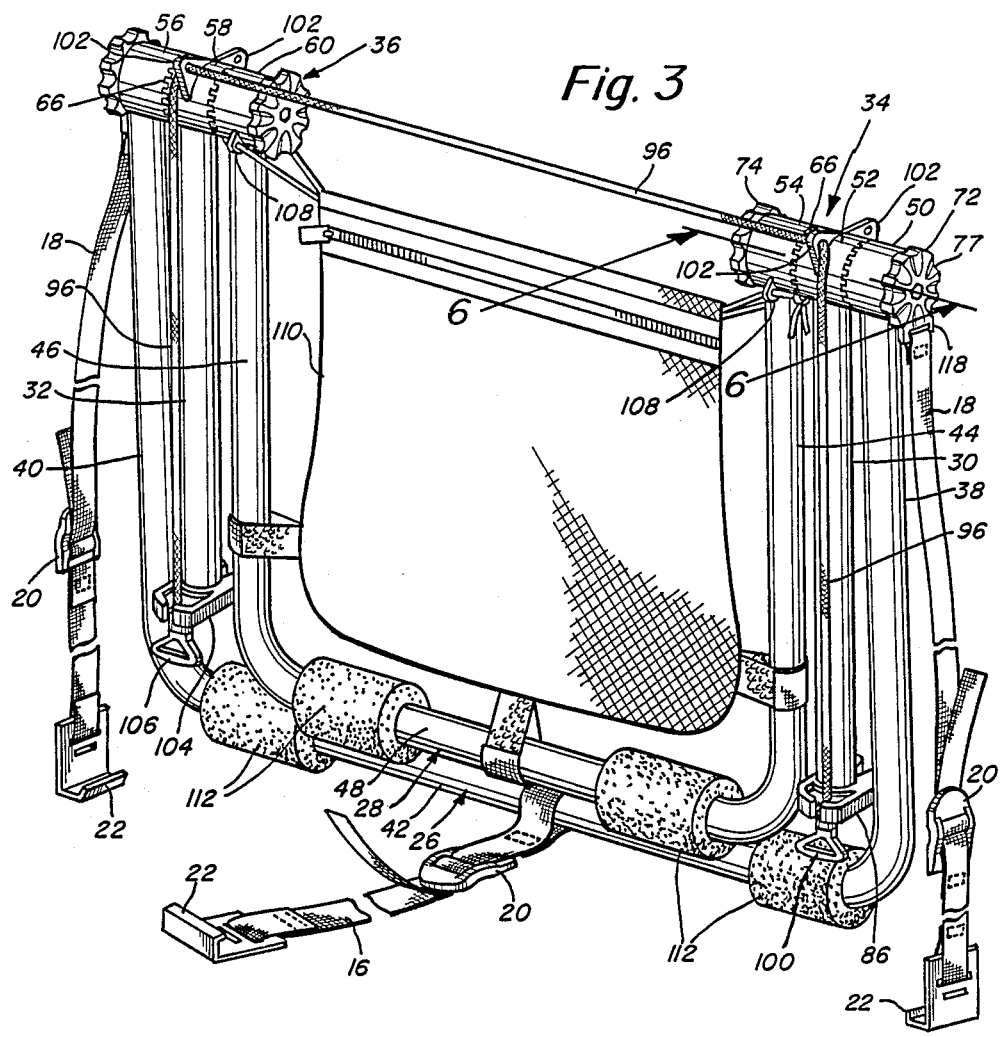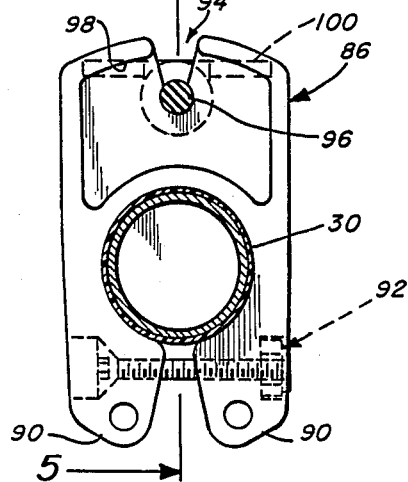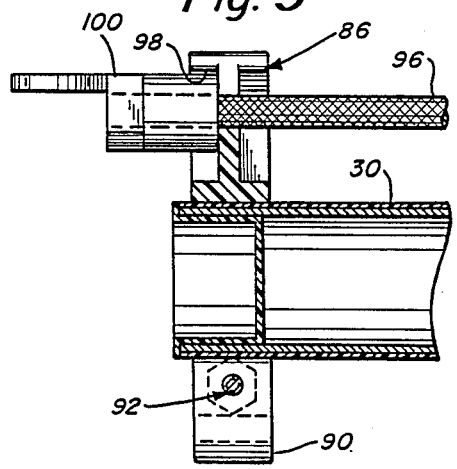

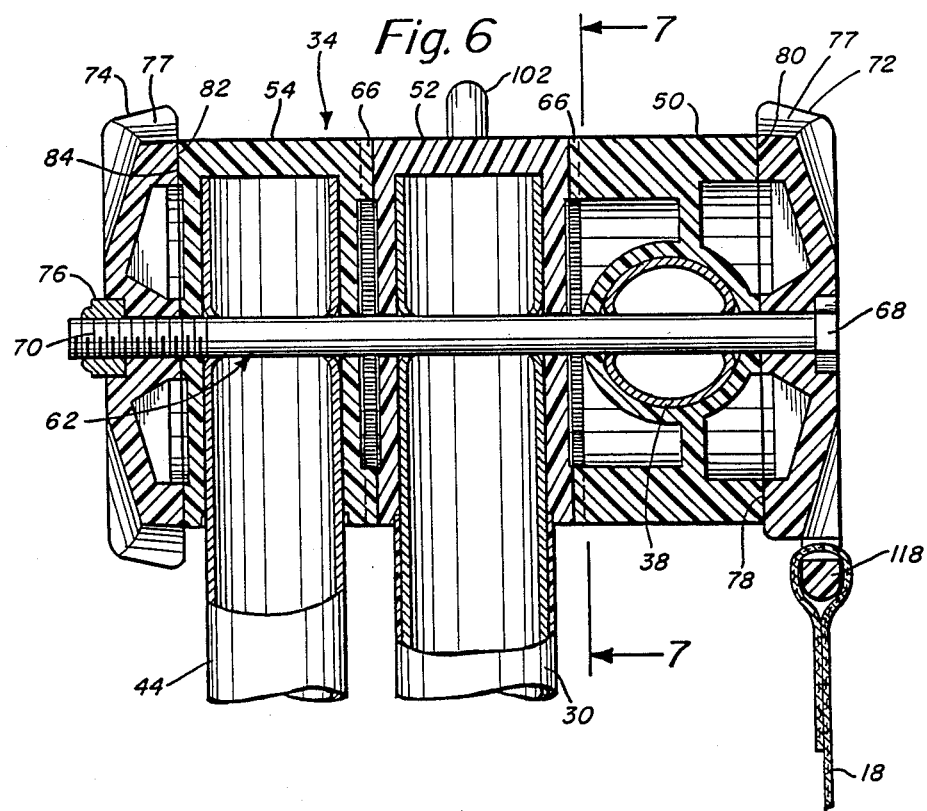
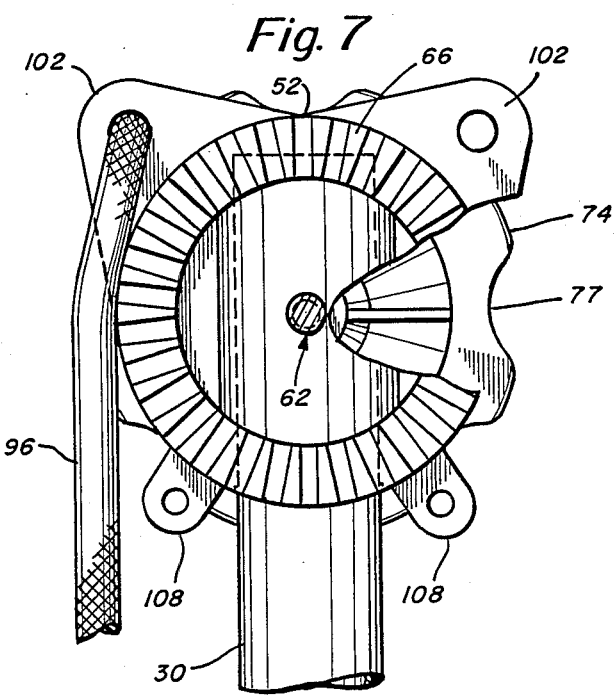

BICYCLE CARRIER

BACKGROUND OF THE INVENTION

This invention relates to carriers that are designed to be attached to the outside of motor vehicles for carrying a bicycle or other objects.

Many bicycle carriers have been designed for carrying a bicycle on the back of a motor vehicle. Examples of known carries are shown in U.S. Pat. Nos. 3,710,999, 4,085,874, 4,109,839, 4,290,540, 4,332,337, 4,336,897, 4,394,948, 4,428,516, 4,452,385, 4,513,897 and 4,518,108. While these patents indicate many attempts to provide a suitable carrier for bicycles, all of the known carriers to have various drawbacks. Particularly troublesome is that known carriers are not adequately designed to attach to the rear of virtually any motor vehicle, most carriers being adapted to attach only to certain rear designs of certain motor vehicles. The invention eliminates this and other drawbacks of the prior art.

SUMMARY OF THE INVENTION

It is an object of the invention to provide a carrier capable of being secured safely to the back of virtually any motor vehicle.

Another object of the invention is to provide a carrier capable of being secured to the back of a motor vehicle having a spoiler in a manner to avoid contacting and damaging the spoiler.

Still another object of the invention is to provide a bicycle carrier having independently adjustable support arms.

Still another object of the invention is to provide a bicycle carrier that may be collapsed into substantially a single plane for convenient storage and shipment.

Yet another object of the invention is to provide a cycle carrier having frame members and bicycle support arms easily adjustable over a great range of relative angles in small discrete increments.

According to the invention, a collapsible carrier adapted for use on the rear portion of a motor vehicle is provided. The carrier has an outer frame member having a hub end carrying an outer hub, an inner frame member having a hub end carrying an inner hub and a support arm having a hub end carrying a middle hub. The hubs are aligned in face-to-face relationship along a central axis. The axis is defined by a rod passing centrally through the hubs such that the hubs may be rotated independently about the rod. The hubs are provided with teeth or castellations on their facing surfaces. The hubs may be secured in various rotational relationship so that the frame members and support arm may be positioned and held at various angles to one another by bringing the mating castellations into locking engagement. The hubs may be moved apart from one another so that the castellations are disengaged and the hubs may rotate freely and independently along the central rod. Preferably the rod is a bolt having a threaded end and a head end. A nut engages the threaded end and acts with the head end as the nut is turned onto the threaded bolt to move the hubs together bringing the castellations of the hubs into locking engagement. Preferably the hub assembly includes gripping discs, one of the gripping discs engaging the head end and the other of the gripping discs engaging the nut end such that rotation of the discs causes rotation of the nut and bolt. The gripping discs act as torquing members for turning the nut and bolt and also act with the nut and bolt to hold the hubs together with the castellations in mating or locking engagement.

BRIEF DESCRIPTION OF THE DRAWINGS

FIG. 3 shows the carrier in its folded storage or shipment arrangement;

FIG. 4 is a cross-section along lines 4—4 of FIG. 2 showing a bracket attached to the support arm of the carrier;

FIG. 5 is a cross-section along lines 5—5 of FIG. 4;

FIG. 6 is a cross-section along lines 6—6 of FIG. 3 showing the hub assembly of the invention; and FIG. 7 is a cross-section along lines 7—7 of FIG. 6.

DETAILED DESCRIPTION OF THE DRAWINGS

Figure 1:
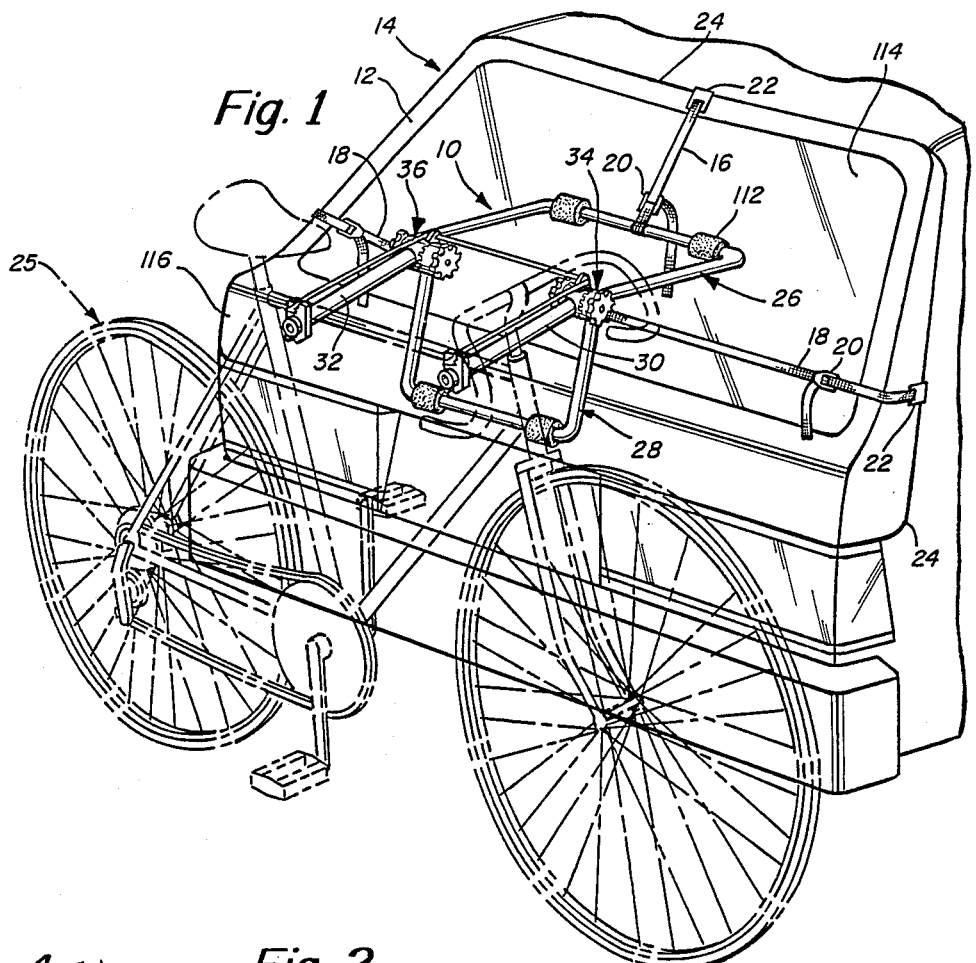
FIG. 1 shows the carrier secured to the rear of a hatchback type of motor vehicle.

FIG. 1 illustrates the preferred embodiment of the carrier 10. The carrier 10 is secured to the hatchback lid 12 of an automobile 14. Upper strap 16 and side straps 18 are attached to and extend from the carrier 10 to secure the carrier 10 to the hatchback lid 12. The straps 16, 18 include buckles 20 for adjusting the length of the straps 16, 18 and the straps terminate with attachment brackets 22, which brackets 22 are adapted to grip the outer edge 24 of a hatchback or trunk lid. A bicycle 25 depicted in a phantom image is supported by the carrier 10. The straps 16, 18, buckles 20 and attachment brackets 22 may be of any conventional design well-known to those skilled in the art and are not considered a part of the invention.

The carrier 10 has two U-shaped frame members 26, 28 and two straight support arms 30, 32. The frame members 26, 28 and support arms 30, 32 are connected at and radiate from two hub assemblies 34, 36. The hub assemblies 34, 36 define an axis about which the frame members 26, 28 and support arms 30, 32 may rotate independently.

The larger outer frame member 26 defines two legs of equal length, a first leg 38 and a second leg 40, joined at their outer end by a first crossbar 42. The smaller inner frame member 28 also defines two legs of equal length, a first leg 44 and a second leg 46, joined at their outer ends by a second crossbar 48. The legs 44, 46 and the second crossbar 48 of the inner frame member are shorter in length than the legs 38, 40 and first crossbar 42, respectively, of the outer frame member 26, such that the inner frame member 28 may be aligned to fit within the space defined by the outer frame member 26.

Referring now to FIG. 3, each of the legs of the frame members and each of the support arms is connected at its inner or hub end to a disc-like hub. The first leg 38 of outer frame members connects to and radiates rotatably from a first outer hub 50, the first support arm 30 connects to and radiates rotatably from first middle hub 52, and the first leg 44 of the inner frame member connects to and radiates rotatably from first inner hub 54. The first outer, middle and inner hubs 50, 52, and 54 are aligned in facing relation with the middle hub between the inner and outer hub forming, roughly, a cylinder. The first outer, middle and inner hub 50, 52 and 54 are part of the first hub assembly 34.

The second leg 40 of the outer frame member 26 connects to and radiates rotatably from a second outer hub 56, the second support arm 32 connects to and radiates rotatably from a second middle hub 58, and the second leg 46 of inner frame member 28 connects to and radiates rotatably from a second inner hub 60. The second outer, middle and inner hubs 56, 58 and 60 are also aligned in facing relation with the middle hub between the outer and inner hubs forming, roughly, a second cylinder. The second outer, middle and inner hubs 56, 58 and 60 are part of the second hub assembly 36.

In its folded or storage state, shown in FIG. 3, the hub assemblies 34, 36 appear as two cylinders separated by a space and lying along a common axis. Each hub assembly defines three smaller cylinders or hubs, an outer hub, a middle hub and an inner hub aligned end-to-end. The hub assemblies are arranged as mirror images such that the first and second inner hubs are closest together and the first and second outer hubs are farthest apart.

The legs 38, 40 and first crossbar 42 of the outer frame member define substantially a first plane. The legs 38, 40 of the outer frame member depend in this plane radially from the outer hubs 50, 56. The legs 38, 40, 44, 46 are substantially perpendicular to the axis defined by the hub assemblies. The legs 44, 46 and crossbar 48 of the inner frame member 28 define substantially a second plane. The legs 44, 46 of the inner frame member 28 depend in this plane radially from the inner hubs 54, 60. When the outer frame member 26 and the inner frame member 28 radiate in the same direction from the hubs and substantially within the same plane, then the inner frame member 28 lies substantially within the space defined by the outer frame member 26.

The support arms 30, 32 depend radially from the middle hubs 52, 58, respectively, and define planes substantially perpendicular to the axis defined by the hub assemblies. The support arms 30, 32 are of a length such that when they radiate in the same direction and substantially within the plane defined by the outer frame member, they lie within the space defined by the outer frame member 26. Essentially, the support arms 30, 32 are shorter in length than the legs 38, 40 of the outer frame member. Thus it may be understood that in the collapsed or storage state, the inner frame member 28 and the support arms 30, 32 all lie substantially within the space defined by the outer frame member 26. The assembly is compact for easy storage and shipment.

The first hub assembly is shown in cross-section in FIG. 6. The second hub assembly is the mirror image of the first hub assembly and will not be described further. A rod or first bolt 62 passes centrally through first outer, middle and inner hubs 50, 52 and 54. Each of the first hubs may rotate about this central bolt.

The hubs of a hub assembly may be rotated independently about the bolt and disengagedly locked in various rotational relationship such that the frame members and support arms are positioned in various angular relationships to one another. The hubs have teeth or mating castellations 66 on their facing surfaces which, when engaged, lock the hubs in position at the desired rotational relationship. The teeth are sized to allow small incremental adjustments of the rotational relationship between the various hubs. Preferably there are at least 20 castellations and most preferably there are 30 castellations evenly spaced circumferentially about the facing surfaces of the hubs to provide for small incremental adjustments of about 12°.

A preferred attachment of the frame members and support arms to their respective hubs is as follows. The first leg 38 of outer frame member 26 extends through a channel into first outer hub 50, first support arm 30 extends through a channel into first middle hub 52 and first leg 44 of inner frame member 28 extends through a channel into first inner hub 54. First bolt 62 extends centrally through the aligned hubs. First bolt 62 also passes through the hub end of the legs of the frame members and through the hub end of the support arm disposed internally of the hubs. Thus, in addition to providing an axis about which the hubs rotate, the bolt secures the legs of the frame members and the support arm to the hubs.

The first bolt 62 has a head end 68 and a threaded end 70. A first gripping disc 72 is connected to the head end 68 of the first bolt 62 such that rotating the gripping disc translates rotational force to the first bolt 62. A second gripping disc 74 is connected to a threaded nut 76 having threads that mate with the threaded end 70 of the first bolt 62. Rotation of the second gripping disc 74 causes rotation of the threaded nut. The gripping discs 72, 74 sandwich the aligned outer middle and inner hubs. The gripping discs are provided with alternating ridges or grooves 77 to allow a person to apply a firm grip to the gripping disc.

When a rotational force is applied to the gripping discs to cause the nut to be threaded onto the threaded end of the first bolt 62, the gripping discs 72, 74 are brought closer together. The inner face 78 of the first gripping disc 72 contact may be moved to the outer face 80 of the first outer hub 50 and the inner face 82 of the second gripping disc 74 contact may be moved to the outer face 84 of the first inner hub 54. As the gripping discs come together, they force the hubs closer together causing the castellations 66 to mate in their locked position. Likewise, by rotating the gripping discs such that the discs are moved apart from one another, the forces holding the mating castellations of the hubs in locked position are released. The hubs may be separated disengaging the mating castellations 66 and the hubs then may be rotated to a different position. In the most preferred embodiment, the frame members and hubs are sized such that the castellations are not engaged when no force is applied by the gripping discs. Bringing the gripping discs together forces the legs of the outer frame member together and/or spreads the legs of the inner frame apart and brings the castellations into mating engagement. When the discs are moved apart, the legs of the outer frame member spread apart resuming their resting position and/or the legs of the inner frame member come together resuming their resting position. In this manner, the hubs attached to the legs of the frame members are drawn apart to separate the mating castellations from locking engagement.

Referring now to FIGS. 2 through 5, the support arms include spacer brackets 86 which act to locate the bike frame 88 (FIG. 2) at a particular position along the support arm. The spacer bracket is essentially a clamp which may be slip-fit over the support arm. A spacer bracket has two legs 90 joined by a nut and bolt arrangement 92. Tightening the nut and bolt arrangement clamps the spacer bracket 86 tightly and immovably at a position along the support arm. Loosening the nut and bolt arrangement allows the spacer bracket 86 to be moved along the support arm to another position. The spacer bracket 86 also includes a slot 94 for receiving an elastic tie cord 96 and a lip 98 for engaging a handle 100 attached to the end of the elastic tie cord 96.

In the most preferred embodiment, each of the support arms includes at least one spacer bracket 86 and each of the middle hubs from which the support arms radiate includes a lug 102 through which the cord 96 may pass (FIG. 7). The handle 100 at one end of an elastic tie cord is engaged by a lip 98 of a first spacer bracket 86 on the first support arm. The tie cord passes through the slot 94 on the spacer bracket 86 and extends through a first lug 102 on the first middle hub. Then the tie cord extends through a second lug 102 on the second middle hub and finally through the slot on a spacer bracket secured to the second support arm. A second handle 106 at the opposite end of the elastic tie cord 96 secures this opposite end to the spacer bracket 104 on the second support arm. In this manner, the elastic tie cord is integral with the carrier and may be wrapped around the frame of the bike to secure the bike in position by engaging the handles with the lips of the brackets, without the use of knots.

Also in the preferred embodiment, the inner hubs include second lugs 108 for securing a pouch 110 in the space defined substantially by the inner frame member.

Pads 112 are disposed on the crossbars 42, 48 so that the carrier does not scratch the surface of the motor vehicle to which it is secured.

Referring back to FIG. 1, outer frame member 26 and inner frame member 28 are locked by the hub assemblies to one another at an obtuse angle. The pads 112 of the crossbar 42 of the outer frame member are positioned to lie on the window portion 114 of a hatchback lid and the pads 112 of the crossbar 48 of the inner frame member are positioned to lie on a lower frame portion 116 of the hatchback lid. An upper strap 16 extends from the crossbar 42 of the outer frame member to an outer edge 24 of the hatchback lid above the window. Side straps 18 extend from third lugs 118 integral with the outer hubs to attachment points on the outer edge 24 of the hatchback lid on opposite sides of the window portion or below the window portion (not shown). The support arms are disposed about horizontally for supporting the frame of a bicycle.

Figure 2:
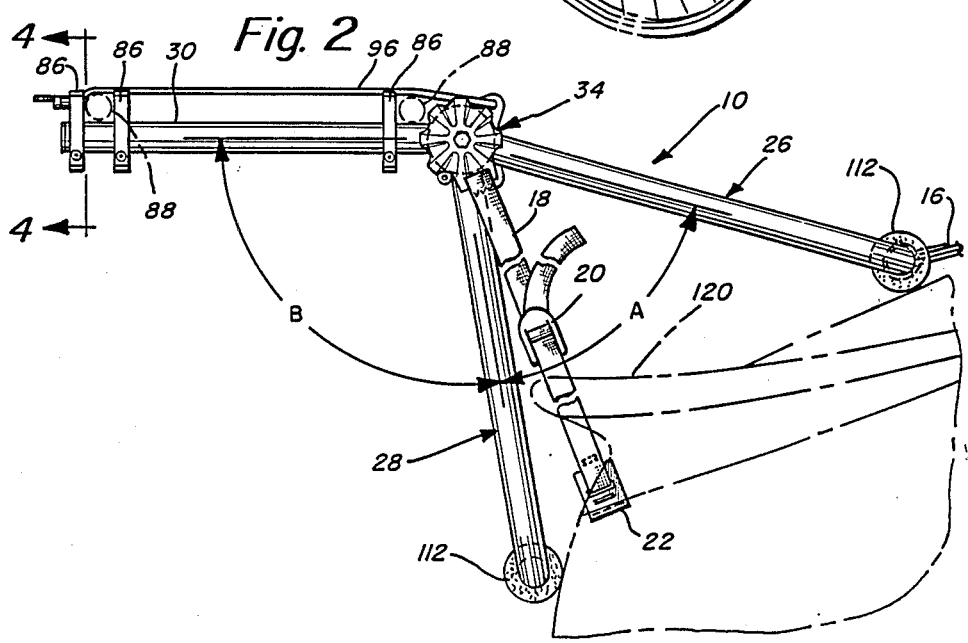
FIG. 2 is a side view showing the carrier attached to the back of a motor vehicle having a spoiler.

Because the frame members and the support arms of the carrier 10 can be disposed at virtually any angle relative to one another, the carrier 10 may be secured to virtually any motor vehicle. FIG. 2 shows the carrier 10 secured to a vehicle having a spoiler 120. The outer frame member 26 and the inner frame member 28 are locked in position at an acute angle such that the frame members surround but do not contact or damage the spoiler. Again, the support arms may be positioned to radiate horizontally from the hub assemblies.

In the preferred embodiment the hubs, brackets and gripping discs are molded plastic pieces and the support arms and frame members are lengths of metal tubing.

It should be understood that various changes and modifications of the embodiment shown in the drawings may be made within the scope of this invention. Thus, it is intended that all matter contained in the above description or shown in the accompanying drawings shall be interpreted in an illustrative and not limiting sense.

What is claimed is:

1. A collapsible carrier adapted for use on the rear portion of a motor vehicle comprising,
   a first frame U-shaped member,
   a second frame U-shaped member,
   a support arm,
   means connecting said frame members and support arm and allowing each of the frame members and support arm to rotate independently from each other, about and substantially perpendicularly to a common axis, and
   means for locking said frame members and said support arm in various angular relationships.

2. A collapsible carrier adapted for use on the rear portion of a motor vehicle comprising,
   an outer frame member attached to an outer hub,
   an inner frame member attached to an inner hub, said frame members sized such that when they are brought substantially within a plane defined by the outer frame member, the inner frame member lies substantially within a space defined by the outer frame member,
   a support arm attached to a middle hub,
   means passing centrally through said hubs and defining a central axis about which said hubs may be rotated independently, and
   means disengagingly locking said hubs in various rotational relationship such that the frame members and support arm may be locked in various relationships to one another.

3. A carrier as claimed in claim 2 wherein said axis-defining means comprises a rod passing centrally through said hubs, and
   said locking means comprises mating castellations on the facing surfaces of said hubs and means for holding said castellations in locking engagement.

4. A carrier as claimed in claim 3 wherein said hubs have about 20 castellations allowing said hubs to be locked in rotational increments of about 18°.

5. A carrier as claimed in claim 3 wherein said rod is a threaded bolt having a head end and a threaded end, and said holding means comprises a nut engaging said threaded end and acting with said head end to hold said castellations in locking engagement.

6. A carrier as claimed in claim 5 further comprising two gripping discs, one of said gripping discs engaging said head end, the other of said gripping discs engaging said nut, and both of said discs acting with said nut and bolt to hold said castellations in mating engagement.

7. A carrier as claimed in claim 6 wherein said hubs have about 20 castellations allowing said hubs to be locked in rotational increments of about 18°.

8. A carrier as claimed in claim 7 further comprising a bracket on said support arm.

9. A collapsible carrier adapted for use on the rear portion of a motor vehicle comprising,
   a first frame member attached to a first hub,
   a second frame member attached to a second hub,
   a support arm attached to a third hub,
   means passing centrally through all of said hubs and defining a central axis about which said hubs may be rotated independently, and
   means disengagingly locking said hubs in various rotational relationships such that the frame members and support arm by be locked in various angular relationships to one another whereby said frame members are adapted to engage a motor vehicle and support said support arm with said support arm engaging and supporting an object.

10. A collapsible carrier adapted for use on the rear portion of a motor vehicle and further adapted to be selectively positioned in a storage position and in various use positions, said carrier including,
    a plurality of frame members and a supporting arm, a pair of axially aligned hub assemblies carrying said plurality of frame members and said supporting arm for selective rotation relative to each other, and means for selectively securing said frame members and support arm in a storage position in which the frame members and support arm are substantially coplanar, and for securing said frame members and support arm in various use positions in which the frame members extend from said hub assemblies at an angle to one another and to said support arm.

11. A collapsible carrier as claimed in claim 10 wherein each of said hub assemblies comprises three axially aligned hubs and said means for selectively securing said frame members comprises means disengagingly locking said hubs in various rotational relationships.

12. A collapsible carrier as claimed in claim 11 wherein said locking means includes castellations on the facing surfaces of said hubs and means for holding said castellations in locking engagement.

13. A collapsible carrier adapted for use on the rear portion of a motor vehicle comprising, an outer frame member having a hub end attached to an outer hub, an inner frame member having a hub end attached to an inner hub, a support arm having a hub end attached to a middle hub, a threaded rod with a head end passing centrally through said hubs and defining a central axis about which said hubs may be rotated independently, castellations on the facing surfaces of said hubs for disengagingly locking said hubs in various rotational relationship such that the frame members and support arm may be locked in various angular relationships to one another, each of said hubs having about 20 castellations allowing said hubs to be locked in rotational increments of about 18°, means for holding said castellations in locking engagement, said means including a nut-engaging threaded end of the rod and acting with said head end to hold the castellations in locking engagement and two gripping discs, one of said gripping discs engaging said head end, the other of said gripping discs engaging said nut, and both of said gripping discs acting with said nut and bolt to hold said castellations in mating engagement, and a bracket on said support arm including means for disengageingly locking the bracket at various positions along the support arm.

14. A collapsible carrier adapted for use on the rear portion of a motor vehicle comprising, an outer frame member having a hub end attached to an outer hub, an inner frame member having a hub end attached to an inner hub, a support arm having a hub end attached to a middle hub, a threaded rod with a head end passing centrally through said hubs and defining a central axis about which said hubs may be rotated independently, castellation on the facing surfaces of said hubs for disengagingly locking said hubs in various rotational relationship such that the frame members and support arm may be locked in various angular relationships to one another, each of said hubs having about 20 castellations allowing said hubs to be locked in rotational increments of about 18°, means for holding said castellations in locking engagement, said means including a nut-engaging threaded end of the rod and acting with said head end to hold the castellations in locking engagement and two gripping discs, one of which gripping discs engaging said head end, the other of said gripping discs engaging said nut, and both of said gripping discs acting with said nut and bolt to hold said castellations in mating engagement, and a bracket on said support arm including attachment means and a lug attached to one of said hubs, each of said hub and attachment means provided for securing a tie cord.

15. A collapsible carrier adapted for use on the rear portion of a motor vehicle comprising, an outer frame member having a hub end attached to an outer hub, an inner frame member having a hub end attached to an inner hub, a support arm having a hub end attached to a middle hub, a threaded rod with a head end passing centrally through said hubs and defining a central axis about which said hubs may be rotated independently, castellations on the facing surfaces of said hubs for disengagingly locking said hubs in various rotational relationship such that the frame members and support arm may be locked in various angular relationships to one another, each of said hubs having about 20 castellations allowing said hubs to be locked in rotational increments of about 18°, means for holding said castellations in locking engagement, said means including a nut-engaging threaded end of the rod and acting with said head end to hold the castellations in locking engagement and two gripping discs, one of which gripping discs engaging said head end, the other of said gripping discs engaging said nut, and both of said gripping discs acting with said nut and bolt to hold said castellations in mating engagement, a bracket on said support arm, and a pouch suspended substantially within the plane defined by the inner frame member and means for suspending said pouch substantially within the plane defined by the inner frame member.

16. A collapsible carrier adapted for use on the rear portion of a motor vehicle and further adapted to be selectively positioned in a storage position and in various use positions, said carrier including, a plurality of frame members and a supporting arm, a pair of axially-aligned hub assemblies carrying said plurality of frame members and said supporting arm for selective rotation relative to each other, each of said hub assemblies comprising three axially-aligned hubs, means disengagingly locking said hubs in various rotational relationships including a storage position in which the frame members and support arm are substantially coplanar and various use positions in which the frame members extend from said hub assemblies at an angle to one another and to said support arm, and wherein said frame members are U-shaped and have a resting position, said frame members being sized such that the facing surfaces of the hubs are separated in the resting position, and whereby a force is required to bring the facing surfaces of the hubs together to engage said locking means, said frame members being constructed such that they resume their resting position when said force is released, thereby separating the facing surfaces of said hubs to disengage such locking means.

17. A collapsible carrier adapted for use on the rear portion of a motor vehicle comprising,
 an outer frame member having a hub end attached to an outer hub,
 an inner frame member having a hub end attached to an inner hub,
 a support arm having a hub end attached to a middle hub,
 means passing centrally through said hubs and defining a central axis about which said hubs may be rotated independently,
 means disengagingly locking said hubs in various rotational relationships such that the frame members and support arm may be locked in various angular relationships to one another, and
 a bracket on said support arm for limiting movement of a bicycle on said support arm and means for adjustably locking the bracket at various positions on the support arm.

18. A collapsible carrier adapted for use on the rear portion of a motor vehicle comprising,
 an outer frame member having a hub end attached to an outer hub,
 an inner frame member having a hub end attached to an inner hub,
 a support arm having a hub end attached to a middle hub,
 means passing centrally through said hubs and defining a central axis about which said hubs may be rotated independently,
 means disengagingly locking said hubs in various rotational relationships such that the frame members and support arm may be locked in various angular relationships to one another, and
 a lug attached to one of the hubs and a tie cord secured through a hole in the lug.

19. A carrier as claimed in claim 18 further comprising a bracket on said support arm for limiting movement of a bicycle on said support arm, and
 attachment means on said bracket for securing a tie cord.

20. A collapsible carrier adapted for use on the rear portion of a motor vehicle comprising,
 an outer frame member having a hub end attached to an outer hub,
 an inner frame member having a hub end attached to an inner hub,
 a support arm having a hub end attached to a middle hub,
 means passing centrally through said hubs and defining a central axis about which said hubs may be rotated independently,
 means disengagingly locking said hubs in various rotational relationships such that the frame members and support arm may be locked in various angular relationships to one another,
 wherein one of said frame members defines a pair of legs lying parallel in a plane and further comprises a pouch suspended substantially within the plane defined by said pair of legs and means for suspending said pouch substantially within said plane.

* * * * *